(12) United States Patent
Zhang et al.

(10) Patent No.: US 9,973,340 B2
(45) Date of Patent: May 15, 2018

(54) MOBILE CONTENT DELIVERY VIA TOLL-FREE UNIFORM RESOURCE LOCATORS

(71) Applicant: Verizon Patent and Licensing Inc., Arlington, VA (US)

(72) Inventors: Gong Zhang, Waltham, MA (US); Jian Huang, Waltham, MA (US); Susan Kelly, Maynard, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 137 days.

(21) Appl. No.: 14/941,106

(22) Filed: Nov. 13, 2015

(65) Prior Publication Data

US 2017/0141923 A1   May 18, 2017

(51) Int. Cl.
| | |
|---|---|
| *H04L 29/06* | (2006.01) |
| *H04L 9/32* | (2006.01) |
| *H04W 12/06* | (2009.01) |
| *H04W 84/04* | (2009.01) |
| *H04W 12/08* | (2009.01) |
| *H04W 4/24* | (2018.01) |
| *H04L 29/08* | (2006.01) |

(52) U.S. Cl.
CPC .......... *H04L 9/3247* (2013.01); *H04W 12/06* (2013.01); *H04L 63/0823* (2013.01); *H04L 63/10* (2013.01); *H04L 67/02* (2013.01); *H04W 4/24* (2013.01); *H04W 12/08* (2013.01); *H04W 84/042* (2013.01)

(58) Field of Classification Search
CPC ... H04L 9/3247; H04L 63/10; H04L 63/0823; H04W 12/06; H04W 12/08; H04W 84/042
See application file for complete search history.

(56) References Cited

U.S. PATENT DOCUMENTS

| | | | |
|---|---|---|---|
| 8,756,289 B1 * | 6/2014 | Appenzeller | H04L 51/12 709/206 |
| 9,317,677 B1 * | 4/2016 | Scott | G06F 21/128 |
| 2002/0010627 A1 * | 1/2002 | Lerat | G06Q 30/02 705/14.26 |
| 2002/0174341 A1 * | 11/2002 | Logue | H04L 63/0428 713/178 |
| 2003/0014503 A1 * | 1/2003 | Legout | G06F 21/10 709/219 |

(Continued)

*Primary Examiner* — Hadi S Armouche
*Assistant Examiner* — Sher A Khan

(57) ABSTRACT

A device associated with a cell tower in a Public Land Mobile Network receives, from a mobile device via a network, a uniform resource locator (URL) that is appended with a first signature generated at the mobile device using a private key of a public/private key pair associated with a toll-free campaign. The device obtains a public key of the public/private key pair, extracts the first signature from the URL, decrypts the first signature using the public key to obtain data, and encrypts the data using the private key to generate a second signature. The device compares the second signature with the first signature, denies toll-free network access to content associated with the URL when the second signature does not match the first signature, and designates data involved with accessing the content associated with the URL as being toll-free when the second signature matches the first signature.

20 Claims, 11 Drawing Sheets

(56) References Cited

U.S. PATENT DOCUMENTS

| | | | | |
|---|---|---|---|---|
| 2004/0054794 | A1* | 3/2004 | Lantto | H04L 12/1425 709/229 |
| 2008/0009268 | A1* | 1/2008 | Ramer | G06F 17/30867 455/412.1 |
| 2008/0016537 | A1* | 1/2008 | Little | H04L 63/0853 725/81 |
| 2008/0288778 | A1* | 11/2008 | Skorve | H04L 63/067 713/176 |
| 2010/0124235 | A1* | 5/2010 | Walsh | G06Q 30/0225 370/449 |
| 2010/0211448 | A1* | 8/2010 | Beenau | G06Q 20/3829 705/14.23 |
| 2012/0030774 | A1* | 2/2012 | Keith | H04L 63/0428 726/30 |
| 2012/0278229 | A1* | 11/2012 | Vishwanathan | G06Q 20/123 705/40 |
| 2015/0020178 | A1* | 1/2015 | Grunin | H04L 63/08 726/7 |

* cited by examiner

MOBILE CONTENT DELIVERY VIA TOLL-FREE UNIFORM RESOURCE LOCATORS

BACKGROUND

A Uniform Resource Locator (URL) is a type of Uniform Resource Identifier (URI) which includes a reference to a web resource that further specifies a location of the web resource on a computer network and a mechanism for retrieving the web resource. A typical URL may have the form http://www.example.com/file.html, which specifies a protocol (hypertext transfer protocol (http)), a hostname (www.example.com), and a file name (file.html). Web browsers usually display the URL of a web page in an address bar within the browsers. Web browsers use the URL of the web page for accessing the web page at a remote server, and downloading the web page from the remote server for display in the web browsers.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein implement processes associated with "toll-free" data delivery campaigns that enable mobile users to access content hosted by web servers via their serving networks (e.g., Public Land Mobile Networks), using toll-free URLs, without incurring network data delivery charges. A "toll-free campaign," as described herein, refers to content, hosted by a web server, at a network location associated with a URL that, using processes described herein, is accessible by a mobile user without incurring a network data delivery charge or other charges associated with data usage. A "toll-free URL, as described herein, refers to a conventional URL that is appended with, among other data, a signature which has been generated by a mobile device using a private key of an asymmetric public/private key pair associated with a toll-free campaign. A campaign requester establishes a toll-free campaign via a governing network device (e.g., a toll-free campaign portal), and allocates a budget to the toll-free campaign, where the budget may include a data transfer maximum in Megabytes or Gigabytes, and/or a data delivery cost maximum (e.g., in dollars). When a mobile user attempts to access, via a mobile device, content hosted at a web server that is associated with a toll-free campaign, an application at the mobile device generates a signature using the private key, and appends the signature to the URL that is then included in the content request sent to the web server. A network processing unit in the network (e.g., located at a cell tower in a Public Land Mobile Network) intercepts the content request, extracts the appended signature, and attempts to validate the signature. If the signature is successfully validated, the network processing unit designates data involved with accessing the content associated with the URL as being non-chargeable to the mobile user.

Figure 1A:
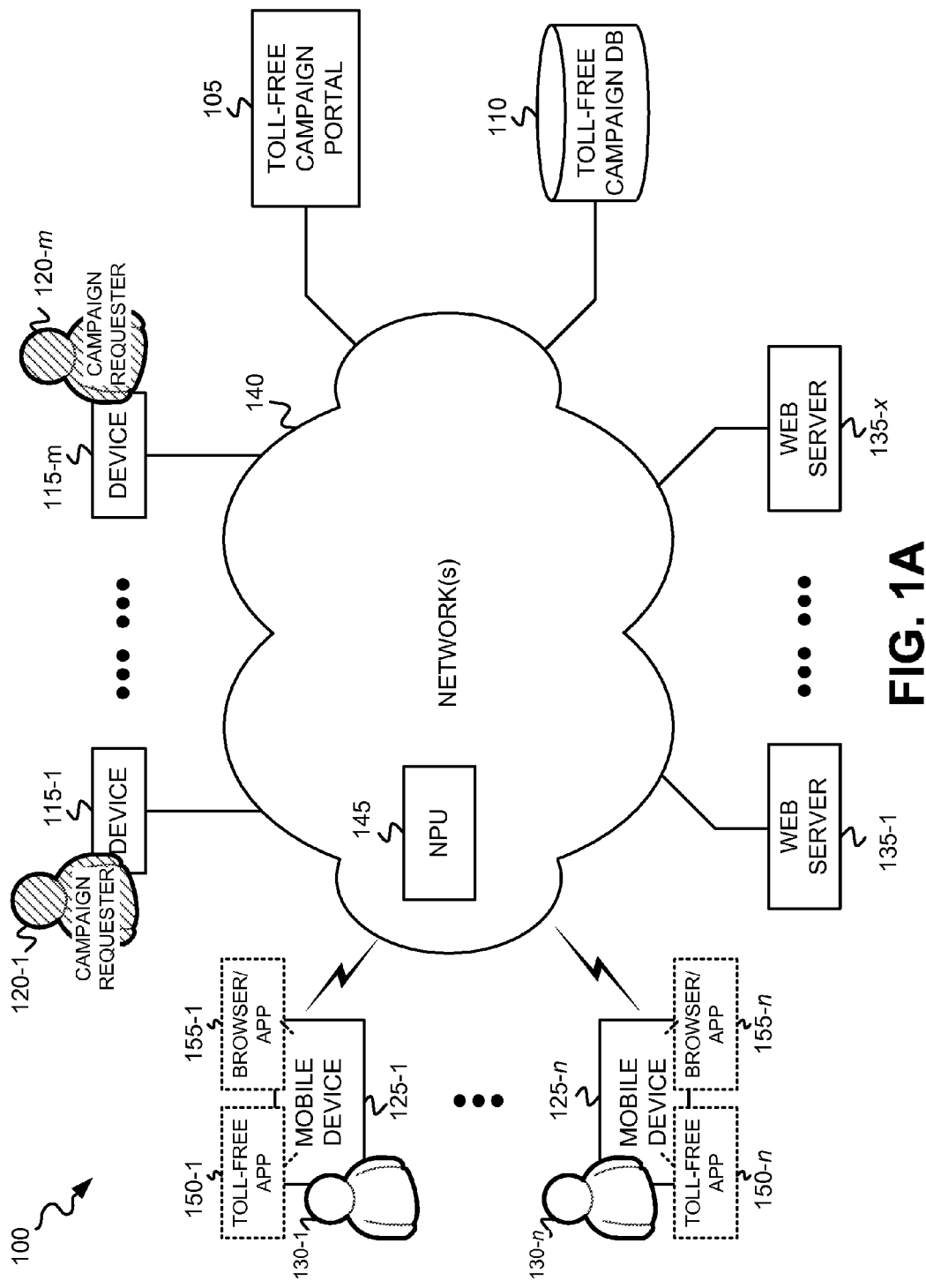
FIG. 1A illustrates an exemplary network environment in which hosted content may be accessed by mobile devices using toll-free URLs such that the hosted content is accessed and delivered to the mobile devices without associated network data charges to mobile users of the mobile devices.

FIG. 1A illustrates an exemplary network environment 100 in which hosted content may be accessed by mobile devices using toll-free URLs such that the hosted content is delivered to the mobile devices without associated network data delivery charges being charged to the mobile users of the mobile devices. Network environment 100 includes a toll-free campaign portal 105, a toll-free campaign database (DB) 110, multiple devices 115-1 through 115-*m* associated with respective campaign requesters 120-1 through 120-*m*, multiple mobile devices 125-1 through 125-*n* associated with respective mobile users 130-1 through 130-*n*, multiple web servers 135-1 through 135-*x*, and a network(s) 140 having a network processing unit (NPU) 145.

Toll-free campaign portal 105 (referred to herein as "campaign portal 105") includes one or more network devices that receive URLs for setting up toll-free data campaigns for content hosted by web servers 135-1 through 135-*x*, and for providing private keys of public/private key pairs for each toll-free campaign to mobile users requesting toll-free access to the content. Toll-free campaign DB 110 (referred to herein as "campaign DB 110") includes one or more network devices that store data structures that include toll-free data campaign information. Campaign portal 105 and/or NPU 145 may access and retrieve the campaign information stored by campaign DB 110.

Devices 115-1 through 115-*m* (generically referred to herein as "device 115" or "devices 115") may include any type of digital computing device that has a capability to communicate with campaign portal 105 or web servers 135 via network(s) 140. Devices 115 may each include, for example, a cellular telephone (e.g., smart phone); a laptop, desktop, palmtop or tablet computer; a set-top box (STB); a wearable computer device (e.g., a wrist watch, glasses, etc.); a media playing device; a game playing device; a digital camera device; or a personal digital assistant (PDA).

Mobile devices 125-1 through 125-*n* (generically referred to herein as "mobile device 125" or "mobile devices 125") may include any type of digital computing device that has a capability to wirelessly communicate with campaign portal 105 or web servers 135 via network(s) 140. Mobile devices 125 may each include, for example, a cellular telephone (e.g., a smart phone); a wireless laptop, palmtop or tablet computer; a wireless wearable computer device (e.g., a wrist watch, glasses, etc.); a vehicle mounted wireless telephone; or a wireless personal digital assistant (PDA).

As shown in FIG. 1A, mobile devices 125-1 through 125-*n* have applications installed locally, including toll-free applications (apps) 150-1 through 150-*n* and mobile web browser/mobile apps 155-1 through 155-*n*. Each of mobile web browser/mobile apps 155-1 through 155-*n* (generically referred to herein as "browser/app 155" or "browsers/apps 155") includes functionality for obtaining a URL for accessing content at one of web servers 135, requesting the content at the URL, and receiving the content corresponding to the URL from the web server 135. The mobile web browser or mobile app of browser/app 155 may be pre-installed on mobile device 125, or may be downloaded by mobile user 130 and installed on mobile device 125. In some implementations, the mobile app may include a third party mobile app that mobile user 130 may retrieve over network(s) 140 and download for installation on mobile device 125.

Each of toll-free apps 150-1 through 150-*n* (generically referred to herein as "toll-free app 150" or "toll-free apps 150") includes functionality for obtaining a campaign identifier (ID) and a campaign private key from campaign portal 105 that corresponds to the URL obtained by browser/app 155. Toll-free app 150 may be pre-installed on mobile device 125, may be automatically uploaded to mobile device 125 based on instructions originating in network(s) 140 or at campaign portal 105, or may be manually downloaded by mobile user 130 for installation on mobile device 125. Toll-free apps 150 generate a signature using the campaign private key, and append the generated signature and the campaign ID to the URL. Toll-free apps 150 pass the URL, with the appended signature and campaign ID, to browsers/apps 155 such that browsers/apps 155 can request the content corresponding to the URL from an appropriate one of web servers 135.

Web servers 135-1 through 135-*x* (generically referred to herein as "web server 135" or "web server 135") may include one or more network devices that host digital content such as, for example, web pages, images, audio content, video content, etc. Web servers 135 may permit the access and retrieval of hosted web content by mobile devices 125 and/or devices 115, as described further herein.

Network(s) 140 may include one or more networks of various types including, for example, a public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs), a satellite mobile network, a telecommunications network (e.g., Public Switched Telephone Networks (PSTNs)), a local area network (LAN), a wide area network (WAN), a metropolitan area network (MAN), an intranet, the Internet, or a cable network (e.g., an optical cable network). In one implementation, network(s) 140 may include a PLMN or satellite mobile network connected to the Internet.

NPU 145 may include a network device, or a portion of a network device, located in network(s) 140 that controls toll-free access to content stored at web servers 135. In one implementation, NPU 145 may be located at a wireless cell tower (e.g., a base station) in a PLMN of network(s) 140. NPU 145 may intercept content requests sent from mobile devices 125 to web servers 135 for accessing content associated with designated URLs, and may validate signatures appended to the URLs by toll-free app 150 at the mobile devices 125. NPU 145, based on successful validation of the signatures, may designate the data associated with respective URLs as free to the mobile users.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though a single NPU 145 is depicted in FIG. 1A, multiple different NPUs 145 may be located in the network(s) 140 (e.g., a PLMN or a satellite mobile network) serving mobile devices 125 at numerous different geographic locations that are covered by the network(s) 140.

Figure 1B:
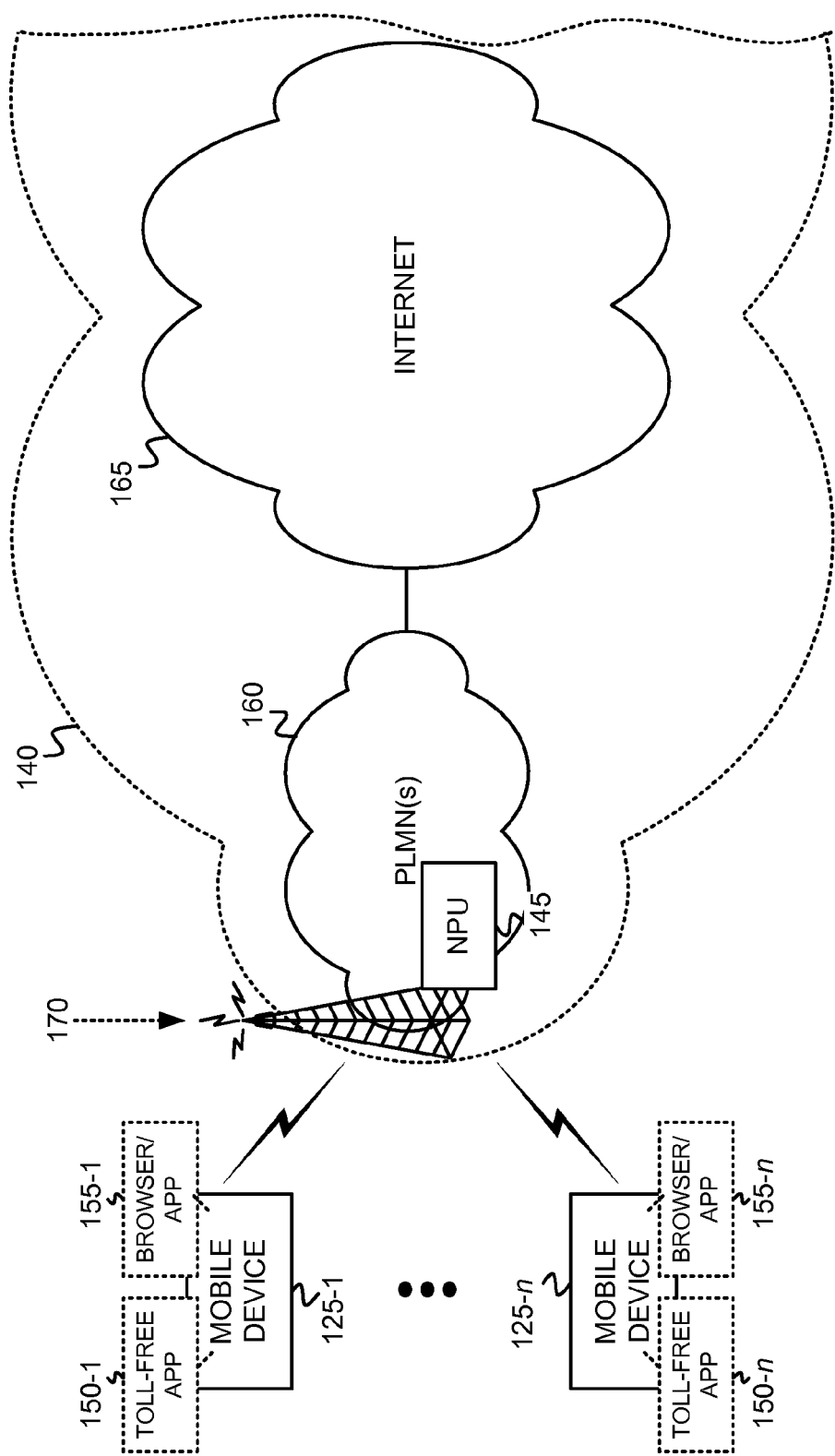
FIG. 1B depicts an exemplary implementation of the network environment of FIG. 1A in which the network of FIG. 1A includes a Public Land Mobile Network(s) connected to the Internet.

FIG. 1B depicts an exemplary implementation of the network environment 100 of FIG. 1A in which network 140 includes a PLMN(s) 160 connected to the Internet 165. As shown in FIG. 1B, NPU 145 may be a component of a wireless cell tower 170 in PLMN(s) 160 or be connected to cell tower 170, where the wireless cell tower 170 serves mobile devices 125-1 through 125-*n*. Data transmitted from mobile devices 125 is received via an antenna of the wireless cell tower 170, and then processed by NPU 145 before being forwarded on to other components of PLMN(s) 160 (not shown) that, in turn, forward the data to its intended destination in PLMN(s) 160, and/or the Internet 165 via the interconnection between PLMN(s) 160 and the Internet 165 (or other destination network in network(s) 140).

Figure 2:
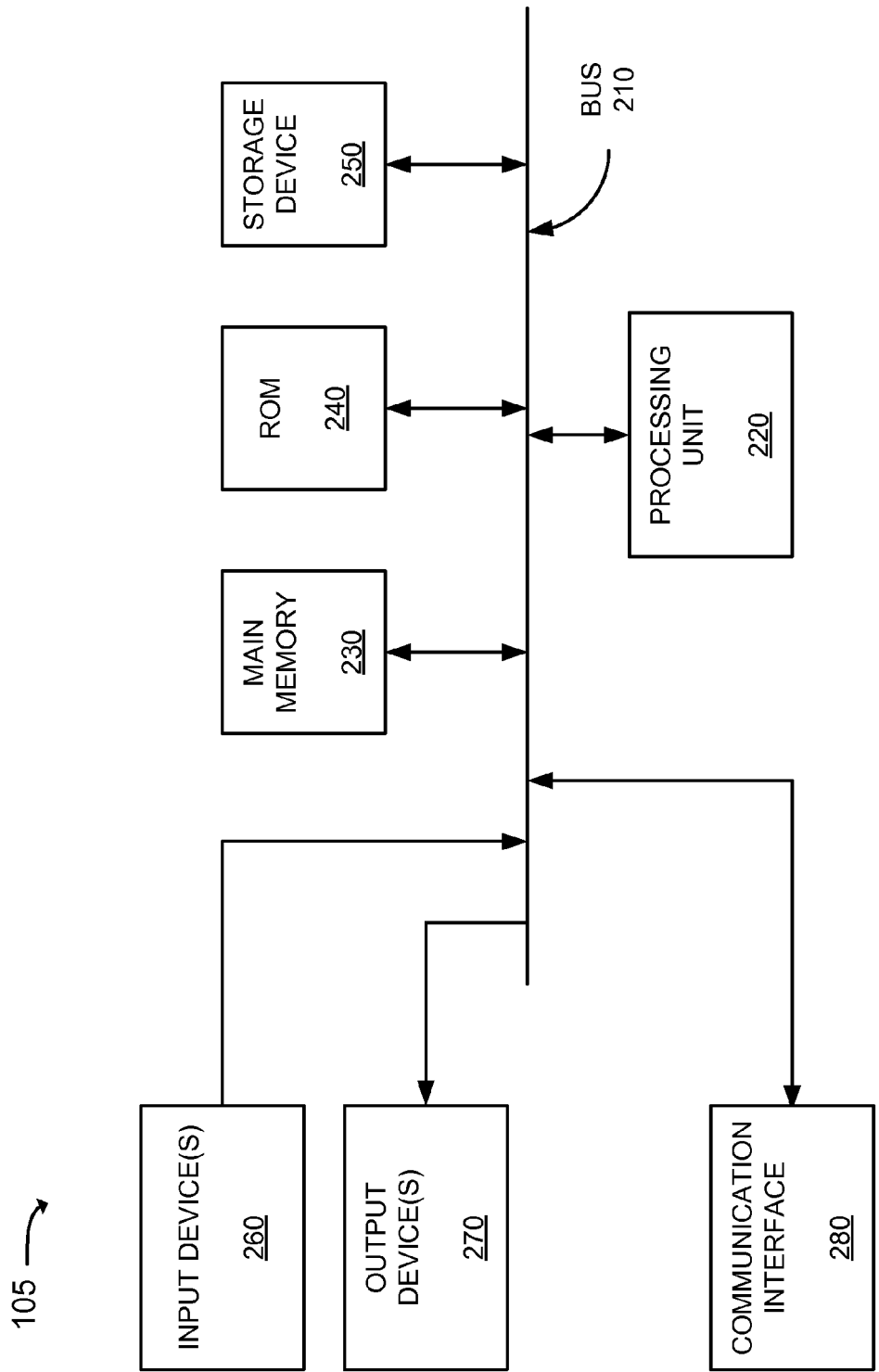
FIG. 2 is a diagram that depicts exemplary components of the campaign portal of FIG. 1A.

FIG. 2 is a diagram that depicts exemplary components of campaign portal 105. Web servers 135, campaign DB 110, NPU 145, devices 115, and mobile devices 125 may each be configured similarly to campaign portal 105 shown in FIG. 2. Campaign portal 105 may include a bus 210, a processing unit 220, a main memory 230, a read only memory (ROM) 240, a storage device 250, an input device(s) 260, an output device(s) 270, and a communication interface(s) 280.

Bus 210 may include a path that permits communication among the components of campaign portal 105. Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that may store static information and instructions for use by processing unit 220. Storage device 250 may include a magnetic and/or optical recording medium. Main memory 230, ROM 240 and storage device 250 may each be referred to herein as a "tangible non-transitory computer-readable medium."

Input device 260 may include one or more mechanisms that permit an operator to input information to campaign portal 105, such as, for example, a keypad or a keyboard, a display with a touch sensitive panel, voice recognition and/or biometric mechanisms, etc. Output device 270 may include one or more mechanisms that output information to the operator or user, including a display, a speaker, etc. Input device 260 and output device 270 may, in some implementations, be implemented as a graphical user interface (GUI) that displays GUI information and which receives user input via the GUI. Communication interface(s) 280 may include a transceiver that enables campaign portal 105 to communicate with other devices and/or systems. For example, communication interface(s) 280 may include wired and/or wireless transceivers for communicating via network(s) 140.

The configuration of components of campaign portal 105 shown in FIG. 2 is for illustrative purposes. Other configurations may be implemented. Therefore, campaign portal 105 may include additional, fewer and/or different components, arranged in a different configuration, than depicted in FIG. 2.

Figure 3:
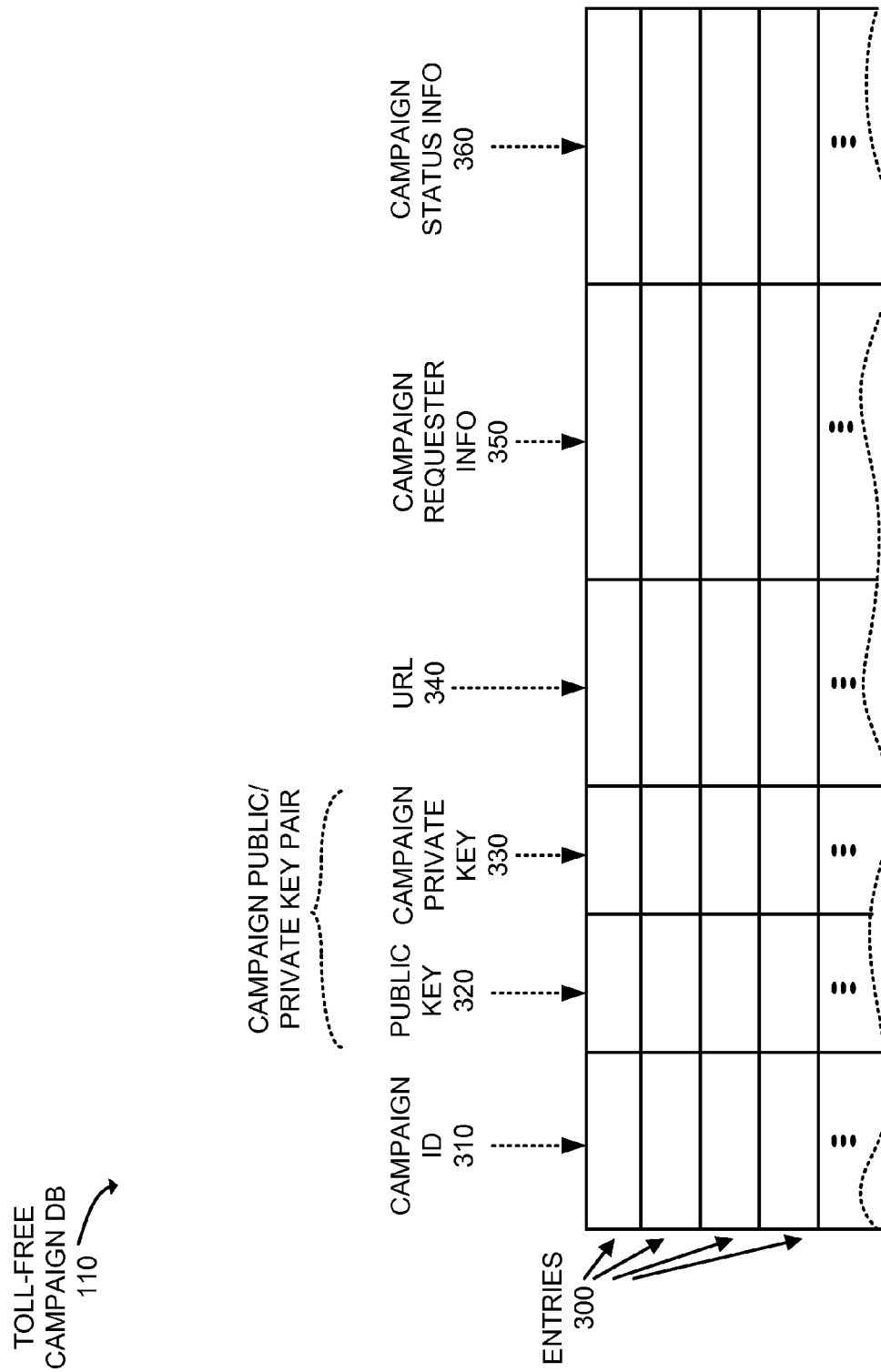
FIG. 3 is a diagram that depicts an exemplary implementation of a data structure associated with the toll-free campaign database of FIG. 1A.

FIG. 3 is a diagram that depicts an exemplary implementation of a data structure stored in campaign DB 110. As shown, the data structure of campaign DB 110 may include multiple entries 300, with each entry 300 including a campaign ID field 310, a public key field 320, a campaign private key field 330, a URL field 340, a campaign requester information field 350, and a campaign status information field 360. Each entry 300 may be indexed with, for example, a particular campaign ID value to locate an entry 300 having a matching campaign ID value stored in campaign ID field 310. When such an entry 300 is located, data may be stored in one or more of fields 320, 330, 340, 350 or 360 of the entry 300, or data may be retrieved from one or more of fields 320, 330, 340, 350 or 360 of the entry 300. Other fields of an entry 300, instead of campaign ID field 310 may be used for indexing campaign DB 110 (e.g., URL field 340).

Campaign ID field 310 stores a unique campaign ID associated with a particular toll-free data campaign requested by a campaign requester 120. The campaign ID may be used by toll-free app 150, campaign portal 105 and/or web server 135 for identifying a particular toll-free campaign associated with a URL. Public key field 320 and campaign private key field 330 store the public/private key pair generated by campaign portal 105 for a particular campaign. Public key field 320 stores the public key associated with the campaign identified by campaign ID field 310 in the entry 300. Campaign private key field 330 stores the private key associated with the campaign identified by campaign ID field 310 in the entry 300. URL field 340 stores the URL, or a group of URLs, associated with the location(s) of particular content, access to which by mobile users is to be toll-free.

Campaign requester information field 350 stores information associated with the campaign requester 120 that has requested a toll-free campaign for a particular URL, or a group of URLs. The information stored in field 350 may include, for example, the identity, physical address, electronic address (e.g., email address), and/or payment information of the campaign requester 120. Campaign status information field 360 stores information associated with the current status of the campaign identified by campaign ID field 310 of entry 300. For example, field 360 may store information that indicates a budget for the toll-free campaign such as, for example, a data transfer maximum in Megabytes (MB) or Gigabytes (GB), or a data transfer cost maximum in dollars, and the current status of the toll-free campaign relative to the budget (e.g., out of budget, low on budget). The campaign status information field 360 may store additional status information indicating, for example, that the campaign is temporarily paused or suspended, the campaign is discontinued, a resumption day and/or time at which a campaign is resumed, a day and/or time at which a campaign begins, etc.

Campaign DB 110 is depicted in FIG. 3 as including a tabular data structure with a certain number of fields having certain content. The tabular data structure of campaign DB 110 shown in FIG. 3, however, is for illustrative purposes. Other types of data structures may alternatively be used. The number, types, and content of the entries and/or fields in the data structure of campaign DB 110 illustrated in FIG. 3 is also for illustrative purposes. Other data structures having different numbers of, types of and/or content of, the entries and/or the fields may be implemented. Therefore, campaign DB 110 may include additional, fewer and/or different entries and/or fields than those depicted in FIG. 3.

Figure 4:
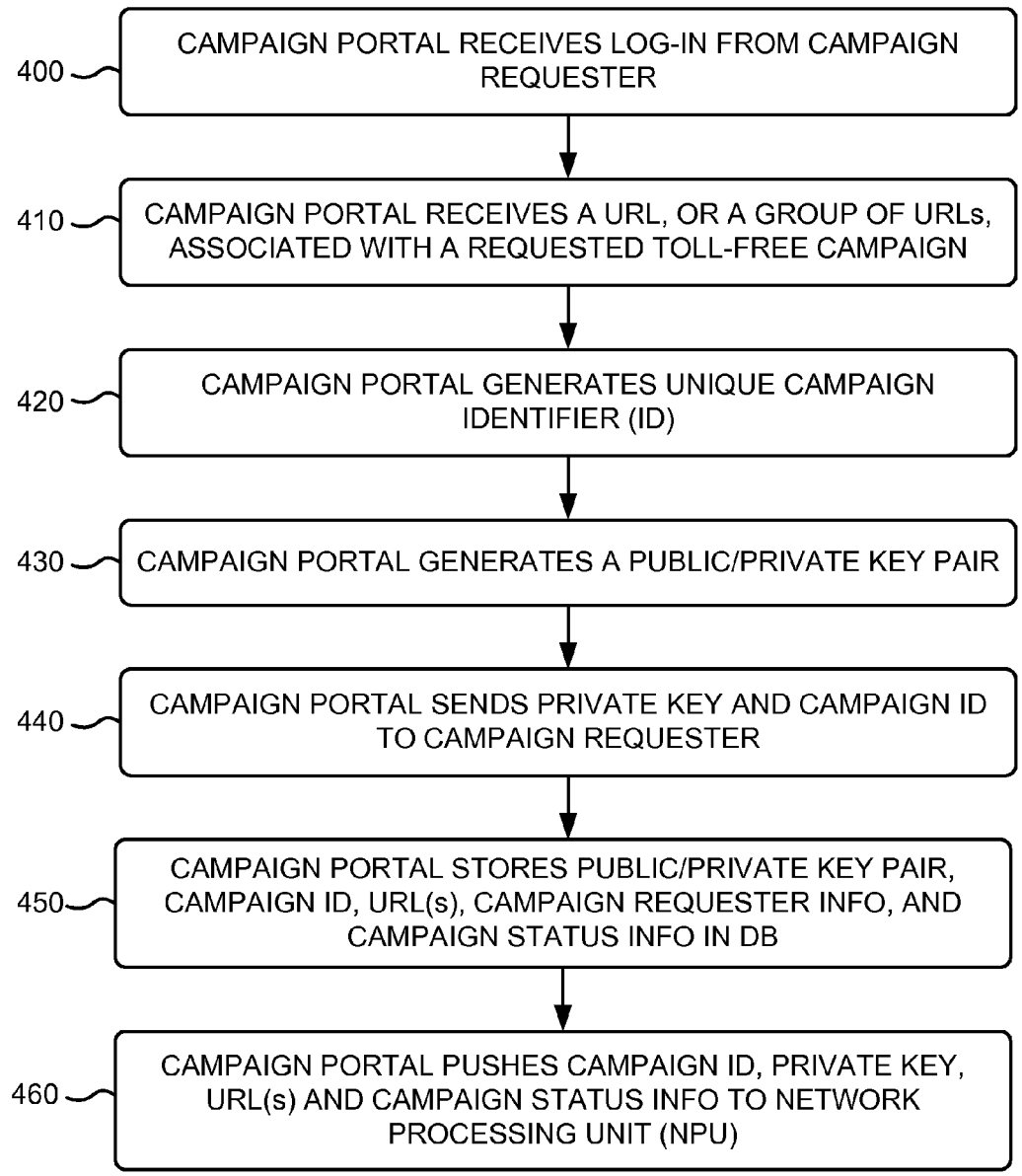
FIG. 4 is a flow diagram that illustrates an exemplary process for establishing a campaign for mobile user toll-free access to content at a particular URL or group of URLs.

FIG. 4 is a flow diagram that illustrates an exemplary process for establishing a toll-free campaign for mobile user toll-free access to content at a particular URL, or a group of URLs ((e.g., access without incurring a network data delivery charge). The exemplary process of FIG. 4 may be implemented by campaign portal 105. The exemplary process of FIG. 4 is described below with reference to the diagrams of FIGS. 5 and 6.

Figure 5:
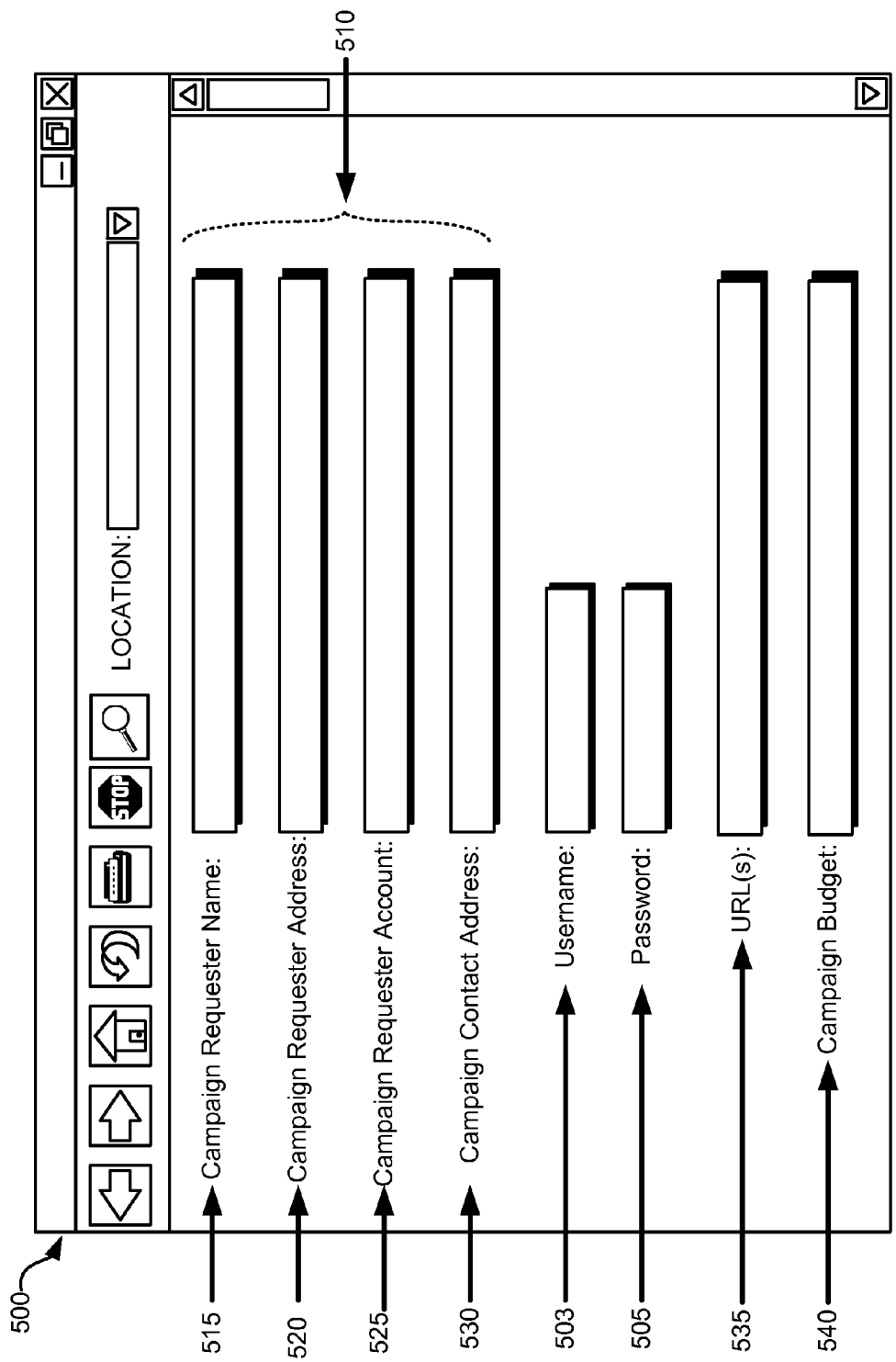
FIG. 5 is an exemplary user interface associated with the exemplary process of FIG. 4.
Figure 6:
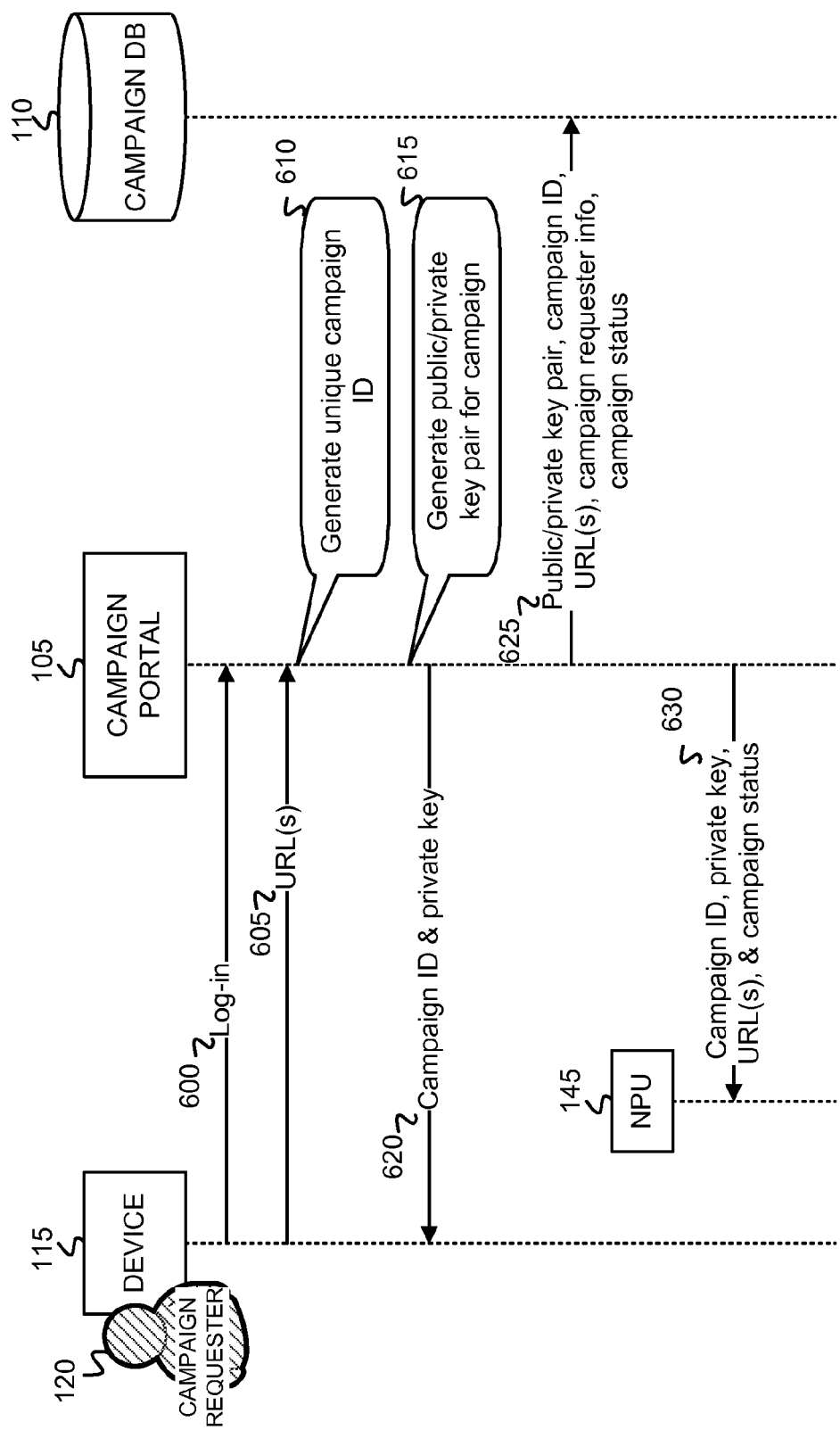
FIG. 6 is an exemplary messaging diagram associated with the exemplary process of FIG. 4.

The exemplary process may include campaign portal 105 receiving a log-in from a campaign requester 120 (block 400). The campaign requester 120 may have previously established an account with campaign portal 105, including selecting a username and password log-in. Campaign requester 120 may, via device 115, send log-in information to campaign portal 105 via network(s) 140. FIG. 5 depicts an exemplary user interface 500, which may be implemented at device 115, via which campaign requester 120 may enter log-in information in a username field 503 and a password field 505. Upon verification of the log-in, campaign portal 105 permits campaign requester 120 to provide, or update, campaign requester information 510, including, for example, entering an entity name in campaign requester name field 515, a physical address in campaign requester address field 520, account information in campaign requester account field 525, and a contact address (e.g., email address and/or phone number) in campaign contact address field 530. Subsequent to verification of the log-in, campaign portal 105 further permits campaign requester 120 to provide the URL, or a group of URLs, to be associated with a particular toll-free campaign. The messaging diagram of FIG. 6 depicts campaign requester 120 providing, via device 115, a log-in 600 to campaign portal 105.

Campaign portal 105 receives a URL, or a group of URLs, associated with a requested toll-free campaign (block 410). Referring to the exemplary user interface 500 of FIG. 5, campaign requester 120 may enter a particular URL, or a group of URLs, in URL(s) field 535, where campaign requester 120 is requesting that content at the particular URL, or group of URLs, be toll-free when accessed by a mobile user 130 via, for example, a PLMN of network(s) 140. In addition to the URL, or group of URLs, campaign requester 120 may supply a campaign budget via a campaign budget field 540 of user interface 500. The campaign budget may include information related to a maximum budget for the toll-free campaign such as, for example, a data transfer maximum in MB or GB, or a maximum data transfer cost in dollars. The campaign budget, therefore, may set a global budget limit on data transfer for the particular toll-free campaign. Once the global budget limit is reached via content accessed by one or more mobile users 130, the campaign will be designated as "out of budget" and no longer valid for subsequent content access requests. In such a case, subsequent content access requests, and the corresponding data delivery, will be charged normal network usage charges (e.g., in MB) to the mobile user 130's account. The messaging diagram of FIG. 6 depicts campaign requester 120 providing, via device 115, a URL, or a group of URLs 605 to campaign portal 105.

Campaign portal 105 generates a unique campaign ID for the requested toll-free campaign (block 420). Any type of numbering or labeling scheme may be used for generating a campaign ID, as long as each generated campaign ID is globally unique among all other campaign IDs. FIG. 6 shows campaign portal 105 generating 610 a unique campaign ID for the URL 605, or group of URLs, received from campaign requester 120. Campaign portal 105 generates a public/private key pair for the requested toll-free campaign (block 430). Any type of asymmetric key pair generation technique may be used for generating the public/private key pair. For example, the public/private key pair may be generated using the Diffie-Hellman encryption algorithm, the ElGamal encryption, the RSA encryption algorithm, or the Cramer-Shoup encryption algorithm. Other types of asymmetric key generation algorithms, however, may be used. FIG. 6 depicts campaign portal 105 generating 615 a public/private key pair for the toll-free campaign. Campaign portal 105 sends the generated campaign ID and the private key of the public/private key pair to the campaign requester 120 (block 440). Referring to FIG. 6, campaign portal 105 sends a message 620 that includes the generated campaign ID and the campaign private key to device 115.

Campaign portal 105 stores the public/private key pair, the campaign ID, the URL(s), campaign requester information, and campaign status information in campaign DB 110 (block 450). Campaign portal 105 may store the campaign ID in campaign ID field 310, the public key of the public/private key pair in public key field 320, the private key of the public/private key pair in campaign private key field 330, the URL or group of URLs in URL field 340, campaign requester information in field 350, and campaign status information in field 360, of an entry 300 of campaign DB 110. As shown in FIG. 6, campaign portal 105 sends 625 the generated public/private key pair, the campaign ID, the URL(s), campaign requester information, and campaign status information to campaign DB 110 for storage.

Campaign portal 105 pushes the campaign ID, private key, URL and campaign status information to NPU 145 (block 460). As shown in FIG. 6, campaign portal 105 sends a message 630 that includes the campaign ID, the campaign private key, the URL(s), and the campaign status to NPU 145. Block 460 may be performed each time a new toll-free campaign is established by a campaigner requester 120, and/or periodically (by itself) to provide updated campaign status information to NPUs 145. Additionally, block 460 by itself, may be conditionally performed such as, for example, when a given campaign becomes out of budget (i.e., the allocated budget is depleted), or becomes paused or suspended. Message 630 sent by campaign portal 105 may be targeted to select NPUs 145 in network 140, may be broadcast to all NPUs 145, or may be broadcast to a regional group of NPUs 145.

The blocks of FIG. 4 may be selectively repeated each time a campaign requester 120 seeks to create a new toll-free campaign associated with a particular URL, or a group of URLs.

Figure 7A:
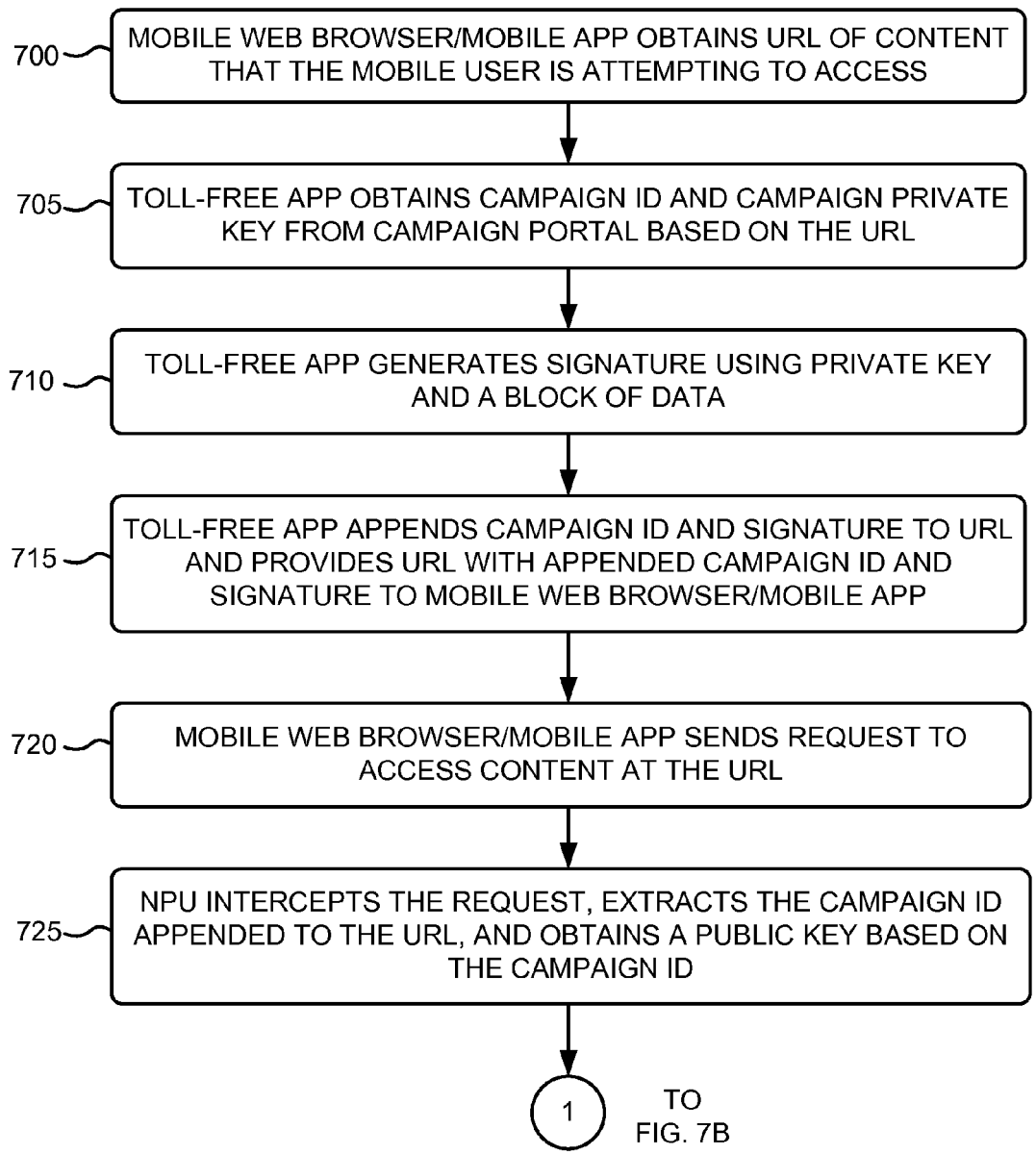
FIGS. 7A-7C are flow diagrams that illustrate an exemplary process for using a URL to access content stored in a network(s) toll-free based on the URL.
Figure 7B:
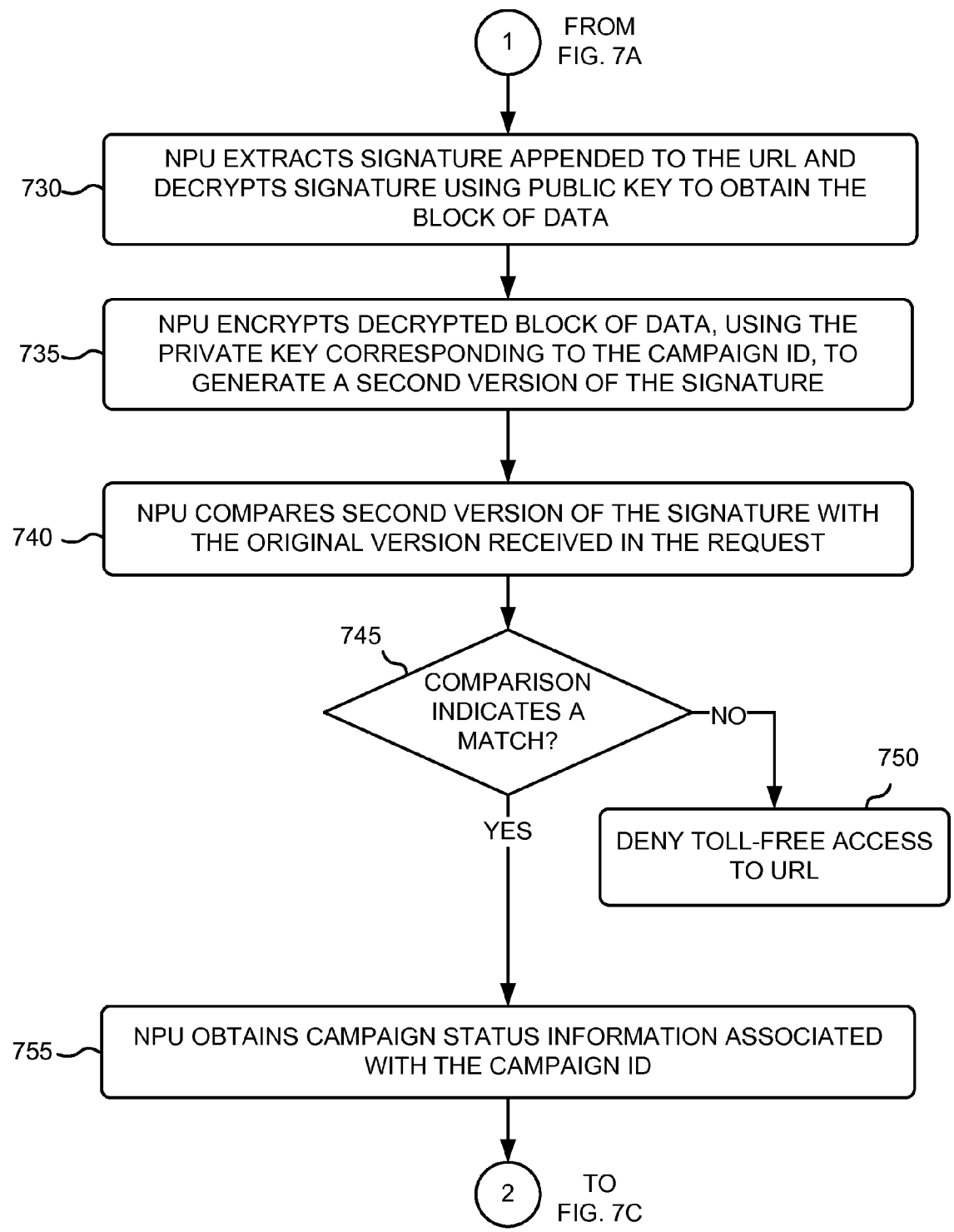
Figure 7C:
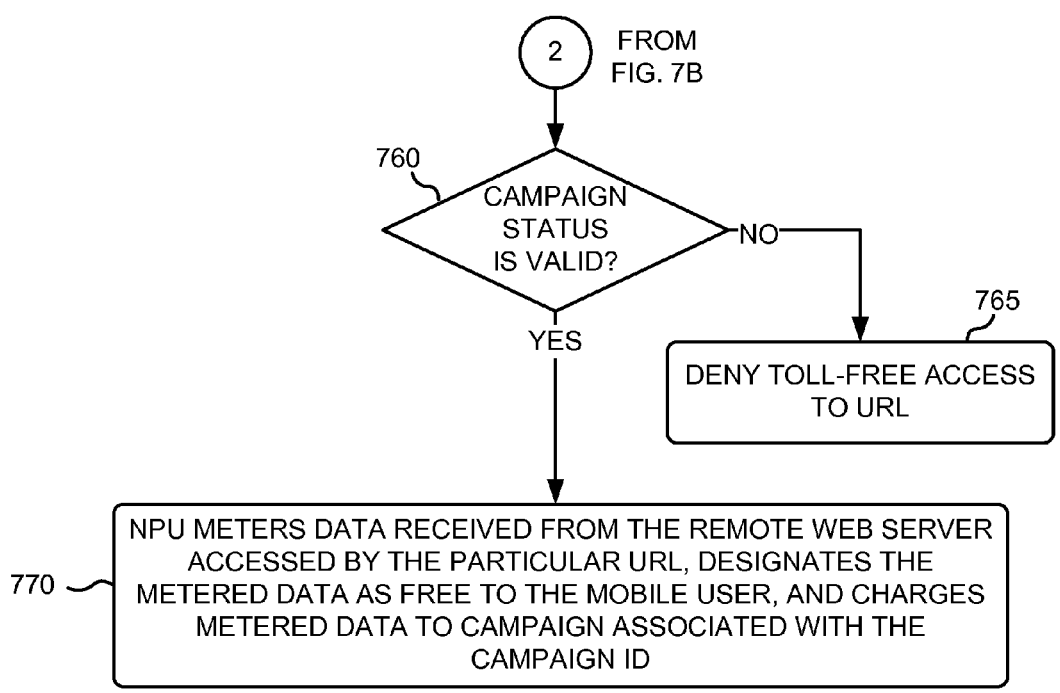

FIGS. 7A-7C are flow diagrams that illustrate an exemplary process for using a URL to access content stored in a network(s) toll-free (i.e., without incurring network data delivery charges or other charges) based on the URL. The exemplary process of FIGS. 7A-7C may be implemented by NPU 145 in conjunction with mobile device 125 and campaign portal 105. The exemplary process of FIGS. 7A-7C is described below with reference to the messaging diagram of FIG. 8.

Figure 8:
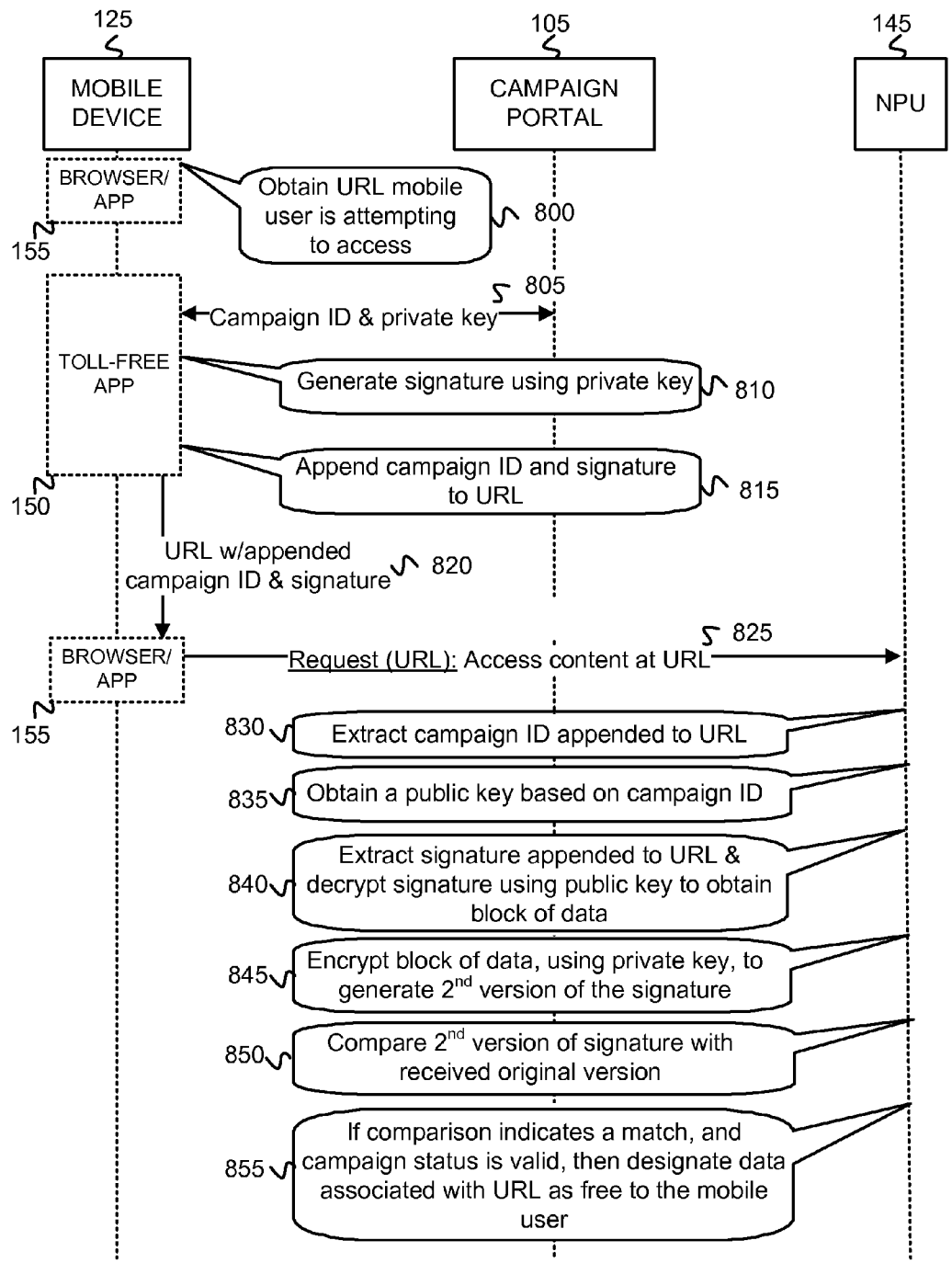
FIG. 8 is an exemplary messaging diagram associated with the exemplary process of FIGS. 7A-7C.

The exemplary process may include mobile web browser/mobile app 155 obtaining a URL of content that a mobile user 130 is attempting to access (block 700). A mobile user 130 may select a URL (e.g., via manual entry, or selecting a hyperlink) while using a mobile web browser or a mobile app. For example, if using a mobile web browser 155 at mobile device 125, mobile user 130 may "touch," using a touch user interface, a hyperlink displayed in a webpage, and the URL associated with the selected hyperlink may be obtained by the mobile web browser. As another example, mobile user 130 may be using a mobile app 155, and upon selection of a certain function or operation within the executing mobile app 155, a URL may be obtained by the executing mobile app 155 for accessing content in network(s) 140. FIG. 8 depicts browser/app 155 executing at mobile device 125 obtaining 800 the URL of content that the mobile user is attempting to access. In one example, the URL may be associated with an MP3 file stored at a web server 135, such as the following exemplary URL: http://10.2.9.42/22779/vzamsdemo/pandora/free/songs/song1.mp3.

Toll-free app 150 obtains the campaign ID and campaign private key from campaign portal 105 based on the URL (block 705). Toll-free app 150 retrieves the URL obtained by mobile web browser/mobile app 155, and requests the campaign ID and private key from campaign portal 105 or campaign DB 110. When campaign portal 105 receives a request for the campaign ID and private key for a particular URL from toll-free app 150, campaign portal 105 performs a lookup into campaign DB 110 by indexing campaign DB 110 with the URL to find an entry 300 having a matching URL value in URL field 340. Upon finding the entry 300 with the matching URL value in URL field 340, campaign portal 105 retrieves the campaign ID value stored in field 310, and the private key stored in field 330 of the entry 300. FIG. 8 shows troll-free app 150 engaging in an exchange 805 with campaign portal 105 involving a request, for a particular URL, for the campaign ID and private key, and a responsive message from campaign portal 105 that includes the requested campaign ID and private key that corresponds to the URL of the content that the mobile user 130 is attempting to access.

Toll-free app 150 generates a signature using the private key and a block of data (block 710). Toll-free app 150 may use any type of asymmetric signature generation algorithm that uses a private key of a public/private key pair to generate a reproducible signature based on, for example, an input block of data, where reversal of the signature to obtain the original input block of data may be performed using the public key of the public/private key pair. Toll-free app 150 may locally cache and/or store the generated signature. FIG. 8 depicts toll-free app 150 generating 810 a signature using the private key received from campaign portal 105.

Toll-free app 150 appends the campaign ID and the signature to the URL and provides the URL with the appended campaign ID and signature to mobile web browser/mobile app 155 (block 715). Returning to the example URL, http://10.2.9.42/22779/vzamsdemo/pandora/free/songs/song1.mp3, the campaign ID and signature may be appended to the URL as follows:

http://10.2.9.42/22779/vzamsdemo/pandoragree/songs/
  song1.mp3?authid=CIAAACAAjAE&authsign=7.54.
  UAbYFmskTJTEZ0fXgaTB_tJUuHFP060QqyH_cbrs
  UM8 where "authid=CIAAACAAjAE" is the campaign ID, and "authsign=7.54.UAbYFmskTJTEZ0fXgaTB_tJUuHFP060 QqyH_cbrsUM8" is the generated signature. FIG. 8 depicts toll-free app 150 appending 815 the campaign ID and signature to the URL, and toll-free app 150 sending the URL 820 with the appended campaign ID and signature to browser/app 155.

Mobile web browser/mobile app 155 sends a request to access content at the URL (block 720). The request to access content includes the URL with the appended campaign ID and signature as produced in block 715. The content request may include, for example, a Hypertext Transfer Protocol (http) content request. FIG. 8 shows browser/app 155 sending a request message 825, which includes the URL appended with the campaign ID and signature, and the message 825 being intercepted by NPU 145 in network(s) 140 on its way to the destination web server 135 via network(s) 140.

NPU 145 intercepts the content request, extracts the campaign ID appended to the URL, and obtains a public key based on the campaign ID (block 725). Referring to the example URL: "http://10.2.9.42/22779/vzamsdemo/pandora/free/songs/song1.mp3?authid=CIAAACAAjAE&authsign= 7.54. UAbYFmskTJTEZ0fXgaTB_tJUuHFP06OQqyH_cbrsUM8," NPU 145 extracts the appended campaign ID "CIAAACAAjAE" from the URL. NPU 145 may obtain the public key by indexing campaign DB 110, via network(s) 140, to locate an entry 300 having a value in campaign ID field 310 that matches the campaign ID extracted from the URL. In an implementation in which NPU 145 is located at a cell tower within the PLMN of network(s) serving mobile device 125, request message 825 is destined for the web server 135 in network(s) 140 that hosts the content associated with the URL, but is intercepted by NPU 145 upon receipt at the serving cell tower, and then processed by NPU 145. In this exemplary implementation, request message 825 is then forwarded by NPU 145 on to the web server 135 in network(s) 140 that hosts the content associated with the URL. FIG. 8 depicts NPU 145 extracting 830 the campaign ID appended to the URL received in the request message 825, and obtaining 835 the public key based on the extracted campaign ID.

NPU 145 extracts the signature appended to the URL and decrypts the signature using the public key to obtain the block of data (block 730). Referring to the example URL: http://10.2.9.42/22779/vzamsdemo/pandora/free/songs/song1.mp3?authid=CIAAACAAjAE&authsign=7.54.UAbYFmskTJTEZ0fXgaTB_tJUuHFP06OQqyH_cbrsUM8, NPU 145 extracts the appended signature "7.54.UAbYFmskTJTEZ0fXgaTB_tJUuHFP06OQqyH_cbrsUM8" and then uses the public key obtained in block 725 as an input to a counterpart decryption algorithm, to the encryption algorithm used in block 710, to decrypt the signature to obtain the original block of data. FIG. 8 depicts NPU 145 extracting 840 the signature appended to the URL received in request message 825, and decrypting the signature using the public key to obtain the original block of data.

NPU 145 encrypts the decrypted block of data, using the private key corresponding to the campaign ID, to generate a second version of the signature (block 735). NPU 145 uses the private key for the campaign identified by the campaign ID received in the request message, and the original block of data recovered in block 730, as inputs to the same asymmetric signature generation algorithm, used in block 710, to generate a second version of the signature. NPU 145 may obtain the private key by performing a lookup of private keys stored locally, such as private keys "pushed" out to NPU 145 in block 460 of FIG. 4. FIG. 8 depicts NPU 145 encrypting 845 the block of data, using the private key, to generate the second version of the signature.

NPU 145 compares the second version of the signature with the original version received in the request (block 740). For example, NPU 145 compares the second version of the signature generated in block 735, with the first version of the signature received in block 730 to determine whether the two versions are identical. FIG. 8 shows NPU 145 comparing 850 the second version of the signature with the received original (first) version. NPU 145 determines if the comparison indicates a match (block 745). If NPU 145 determines that the comparison indicates a match, then the signature appended to the URL intercepted in the content request is successfully validated. If NPU 145 determines that the comparison indicates that the second version, and the first version, of the signature do not match, then the signature appended to the URL intercepted in the content request is invalidated. If the comparison does not indicate a match (NO—block 745), then NPU 145 denies toll-free access to the content at the URL (block 750). However, mobile device 125 will still be able to access the content associated with the URL, but mobile user 130 will be charged normal data delivery or transfer charges. If the comparison indicates a match (YES—block 745), the NPU 145 obtains campaign status information associated with the campaign ID (block 755). NPU 145 may store locally campaign status information previously "pushed" to NPU 145 in block 460 of FIG. 4. Alternatively, NPU 145 may index campaign DB 110, via network(s) 140, to locate an entry 300 having a campaign ID valued stored in field 310 that matches the campaign ID extracted from the URL. NPU 145 may retrieve campaign status information stored in field 360 of the located entry 300 in campaign DB 110.

NPU 145 determines, based on the obtained campaign status information, if the status of the campaign associated with the campaign ID is valid (block 760). The campaign status information may indicate, for example, that the campaign in currently within its budget constraints (i.e., the campaign is currently valid), may indicate that the campaign is currently out of budget (i.e., the campaign is currently invalid), or may indicate that the campaign is currently paused or suspended (i.e., temporarily invalid). The validity of the campaign may also be dependent upon a time associated with the content request or based current network traffic conditions. For example, a given campaign may be valid or invalid during certain time periods, or may be valid or invalid as a function of the current network traffic conditions (e.g., congested network traffic conditions means the campaign is temporarily invalid or suspended). If the campaign status is not valid (NO—block 760), then NPU 145 denies toll-free access to the content at the URL (block 765). However, mobile device 125 will still be able to access the content associated with the URL, but mobile user 130 will be charged normal data delivery or transfer charges. If the campaign status is valid (YES—block 760), then NPU 145 meters data received from the remote web server 135 accessed by the particular URL, designates the metered data as free to the mobile user 130, and charges the metered data to the toll-free campaign associated with the campaign ID (block 770). The data associated with receiving the content request from mobile device 125, and the data associated with the requested content being delivered from web server 135 to mobile device 125 via NPU 145 in network(s) 140, may be metered at NPU 145 and designated by NPU 145 to an accounting node in network(s) 140 (e.g., an accounting node in the PLMN) as being free to mobile user 130 (i.e., mobile user 130's mobile account in PLMN is not charged for the data delivery, but instead the particular campaign's budget is charged with the data delivery). Therefore, for each amount of data designated as being toll-free by NPU 145, the budget of the corresponding toll-free campaign is reduced by the amount of that data. For example, if a particular toll-free campaign has a budget of 100 GB, and 5 MB of content is accessed toll-free by the mobile user 130, then the 5 MB (and possibly additional data associated with the content request) may be subtracted from the 100 GB budget to leave a remaining budget of data still available for the particular toll-free campaign. FIG. 8 depicts NPU 145 determining 855 whether the comparison of the versions of the signature indicate a match and whether the campaign status of the campaign is valid, and designating data associated with the URL as free to the mobile user 130 if the comparison indicates a match and that the campaign status is currently valid.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4 and 7A-7C, and message flows with respect to FIGS. 6 and 8, the order of the blocks and/or message flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A device, comprising:
   a communication interface;
   a memory storing instructions; and
   a processing unit that executes the instructions to:
   connect, via the communication interface, to a network,
   intercept, from a mobile device via a cell tower serving the network, a content request destined for a content host device in the network, wherein the content request includes a uniform resource locator (URL) that is appended with a first signature generated at the mobile device using a first key of an asymmetric key pair associated with a toll-free data campaign,
   obtain a second key of the asymmetric key pair,
   extract the first signature from the URL,
   decrypt the first signature using the second key to obtain a block of data,
   encrypt the block of data using the first key to generate a second signature,
   compare the second signature with the first signature,
   deny toll-free network access to content associated with the URL when the second signature does not match the first signature,
   determine, when the second signature matches the first signature, whether data transfer charged to the toll-free data campaign has reached a data transfer limit allocated to the toll-free data campaign,
   meter, based on a determination that the data transfer limit has not been reached, data delivery associated with toll-free access of the content using the URL, and
   charge, to the toll-free data campaign, the metered data delivery.

2. The device of claim 1, wherein the URL is further appended with a unique identifier associated with the toll-free data campaign.

3. The device of claim 1, wherein the communication interface is further configured to receive, from a network device via the network, a unique identifier associated with the toll-free data campaign and the first key that is further associated with the toll-free data campaign.

4. The device of claim 3, wherein the processing unit further executes the instructions to:
   obtain, via the communication interface, the second key of the asymmetric key pair from a database using the received unique identifier associated with the toll-free data campaign.

5. The device of claim 1, wherein the network comprises a Public Land Mobile Network (PLMN) or a Satellite Mobile Network.

6. The device of claim 1, wherein the URL identifies a network location of the content host device.

7. The device of claim 1, wherein the device comprises a network processing unit (NPU) associated with a base station located in a Public Land Mobile Network (PLMN).

8. A non-transitory storage medium storing instructions executable by a computational device, wherein the instructions comprise instructions to cause the computational device to:
   intercept, from a mobile device via a cell tower serving a network, a content request that is destined for a content host device in the network, wherein the content request includes a uniform resource locator (URL) that is appended with a first signature generated at the mobile device using a first key of asymmetric key pair that is associated with a toll-free data campaign;
   extract the first signature from the URL;
   validate the content request based on the extracted first signature;
   determine, based on the validation of the content request, whether data transfer charged to the toll-free data campaign has reached a data transfer limit allocated to the toll-free data campaign;
   meter, based on a determination that the data transfer limit has not been reached, data delivery associated with toll-free access of the content using the URL, and
   charge, to the toll-free data campaign, the metered data delivery.

9. The non-transitory storage medium of claim 8, wherein the URL is further appended with a unique identifier associated with the toll-free data campaign.

10. The non-transitory storage medium of claim 8, wherein the instructions to validate the content request further comprise instructions to cause the computational device to:
    obtain a second key of the asymmetric key pair,
    decrypt the first signature using the second key to obtain a block of data,
    encrypt the block of data using the first key to generate a second signature, and
    compare the second signature with the first signature.

11. The non-transitory storage medium of claim 10, wherein a mobile user at the mobile device initiates the content request and wherein the instructions further comprise instructions to cause the computational device to:
    deny toll-free network access to the content associated with the URL when the second signature does not match the first signature, and designate data involved with accessing the content associated with the URL as being non-chargeable to the mobile user in the network when the second signature matches the first signature.

12. The non-transitory storage medium of claim 10, wherein the URL is further appended with a unique identifier associated with the toll-free data campaign and wherein the instructions to obtain the second key further comprise instructions to cause the computational device to:
    obtain the second key of the asymmetric key pair from a database via the network using the unique identifier associated with the toll-free data campaign.

13. The non-transitory storage medium of claim 8, wherein the URL identifies a network location of the content host device.

14. A method comprising:
    intercepting, by a device connected to a cell tower serving a network, a content request destined for a content host device in the network, wherein the content request includes a uniform resource locator (URL) that is appended with a first signature generated at a mobile device using a first key of an asymmetric key pair associated with a toll-free data campaign;
    obtaining, by the device, a second key of the asymmetric key pair;
    extracting, by the device, the first signature from the URL;
    decrypting, by the device, the first signature using the second key to obtain a block of data;
    encrypting, by the device, the block of data using the first key to generate a second signature;
    comparing, by the device, the second signature with the first signature;
    denying, by the device, toll-free network access to content associated with the URL when the second signature does not match the first signature;
    determining, by the device, when the second signature matches the first signature, whether data transfer charged to the toll-free data campaign has reached a data transfer limit allocated to the toll-free data campaign;
    metering, by the device and based on a determination that the data transfer limit has not been reached, data delivery associated with toll-free access of the content using the URL; and
    charging, by the device to the toll-free data campaign, the metered data delivery.

15. The method of claim 14, wherein the URL is further appended with a unique identifier associated with the toll-free data campaign.

16. The method of claim 14, further comprising:
    receiving, from a network device via the network, a unique identifier associated with the toll-free data campaign and the first key that is further associated with the toll-free data campaign.

17. The method of claim 16, further comprising:
    obtaining, from a database via the network, the second key of the asymmetric key pair using the unique identifier associated with the toll-free data campaign.

18. The method of claim 14, wherein the network comprises a Public Land Mobile Network (PLMN) or a Satellite Mobile Network.

19. The method of claim 14, wherein the URL identifies a network location of the content host device.

20. The method of claim 14, wherein the device comprises a network processing unit (NPU) associated with a base station located in a Public Land Mobile Network (PLMN).

* * * * *